Nov. 7, 1939.  J. M. SHOEMAKER  2,179,136
TANK FILLER SPOUT CAP
Filed Nov. 27, 1936
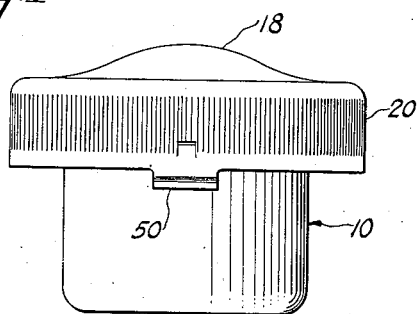
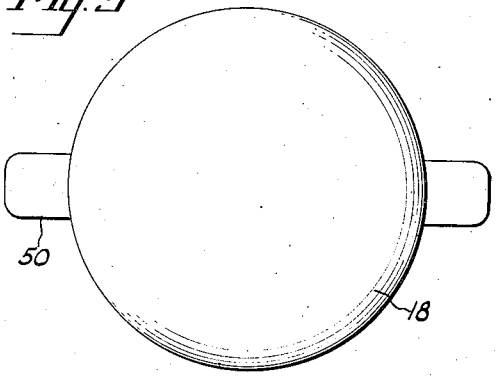
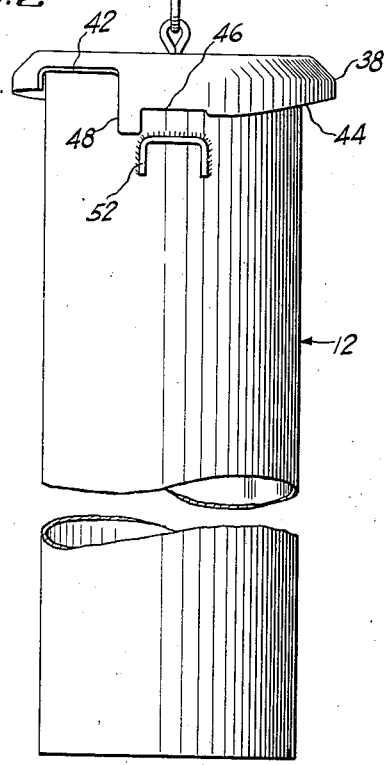
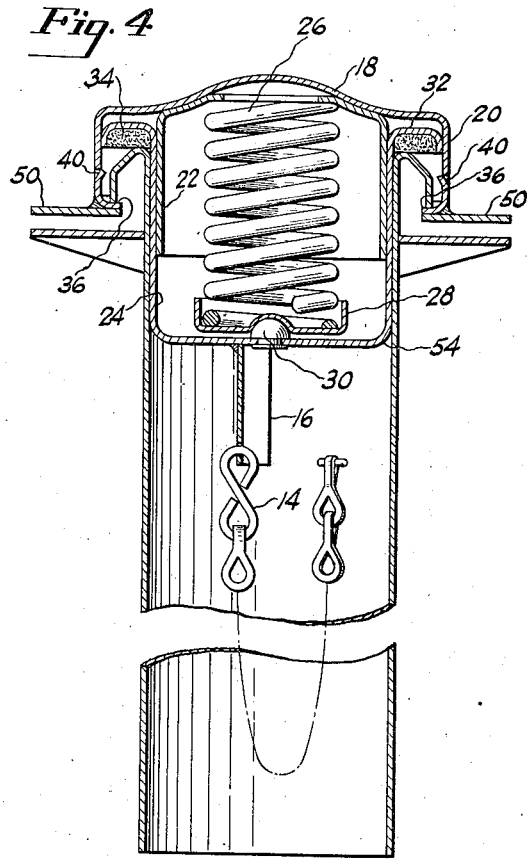
INVENTOR.
James M. Shoemaker
BY Harris G. Luther
ATTORNEY Patented Nov. 7, 1939

2,179,136

UNITED STATES PATENT OFFICE 2,179,136

TANK FILLER SPOUT CAP

James M. Shoemaker, Hartford, Conn., assignor to United Aircraft Corporation, East Hartford, Conn., a corporation of Delaware Application November 27, 1936, Serial No. 113,007

3 Claims. (Cl. 220—40)

This invention relates to improvements in closure members for tank filler spouts and has particular reference to an improved closure cap for the filler spout of a liquid container such as the fuel tank, oil tank, radiator, etc. of a vehicle.

An object of the invention resides in the provision of an improved tank filler spout closure member which will effectively seal the filler spout against leakage of liquid from the tank by the action of gravity upon the liquid which the tank contains even though the tank be inverted.

A further object resides in the provision of an improved closure member of the character specified which will reduce wear of the spout sealing portion and compensate for such wear of the portion as does take place to thereby seal the tank against leakage over a long period of use.

A still further object resides in the provision of an improved closure member of the character specified which is easy to apply to and remove from the filler spout which it closes which cannot be applied in an incorrect manner and which is arranged to be effectively locked upon the filler spout against the danger of accidental disassociation.

An additional object resides in the provision of an improved closure member of the character specified that is light in weight, simple and economical to manufacture, and of such rugged construction that it will given an extended period of trouble-free service.

Other objects and advantages will be more particularly pointed out hereinafter, or will become apparent as the description proceeds.

In the accompanying drawing in which like reference numerals are used to designate similar parts throughout, there is illustrated a suitable mechanical embodiment of what is now considered to be the preferred form of the idea of the invention. The drawing, however, is for the purpose of illustration only, and is not to be taken as limiting the invention, the scope of which is to be measured entirely by the scope of the appended claims.

In the drawing,

Fig. 1 is a side elevational view of an improved filler-spout closure member, or tank cap constructed according to the idea of this invention.

Fig. 2 is a side elevational view of a tank filler spout arranged for the reception of the improved closure member illustrated in Fig. 1.

Fig. 3 is a top plan view of the closure member illustrated in elevation in Fig. 1, and Fig. 4 is a vertical sectional view of a tank filler spout and a filler spout closure member or tank cap, constructed according to the idea of this invention, applied thereto.

Referring to the drawing in detail, the numeral 10 generally indicates the improved tank cap and the numeral 12 generally indicates the filler spout to which it is applied. If desired the tank cap, or closure member 10 may be permanently attached to the filler spout 12 by suitable means such as a length of chain 14, to prevent the accidental loss or displacement of the closure member. In the form of the invention illustrated, one end of the chain is secured by suitable means to the interior of the filler spout, and the opposite end is connected to the cap by the depending tang 16.

The improved closure cap comprises an upper cup-shaped member 18 provided with a peripheral flange 20 (a second cup-shaped member 22 coaxial with the member 18 and having its closed or partly closed end secured to the inner surface of the disc portion of the member 18, and a third cup-shaped member 24 telescopically associated with the cup-shaped member 22.

As stated above, the cup-shaped member 22 is secured within the outer cup-shaped member 18, and has its closed end secured to the closed end of the member 18 by suitable means such as spot-welding, brasing, or riveting. The cup-shaped member 24 telescopically associated with the member 22 has its closed end disposed opposite the closed end of the member 22 to provide between the members 22 and 24 a closed expansible chamber within which there is disposed a coiled compression spring 26. This spring bears at its upper end against the closed end of the inner cup-shaped member 22, and at its lower end rests in a seat 28 supported upon a hemispherical abutment 30 secured in the closed lower end of the outer cup-shaped member 24. From this description it will be observed that the spring 26 tends to force the telescopically associated cup-shaped members 22 and 24 apart in an axial direction.

The cup-shaped member 24 is provided at its open end with an outwardly extending annular flange 32 provided with a channel section to receive a sealing gasket 34, which rests upon the end of the filler spout 12 when the closure member is operatively associated with the filler spout.

The flange portion 20 of the cap member 18 is provided with inwardly extending detents 36 which engage with the lower edge of an outwardly and downwardly turned flange 38 provided on the cap-receiving end of the filler spout 12.

From this description it will be observed that the action of the spring 26 tending to force the members 22 and 24 apart in an axial direction tends to decrease the distance between the gasket 34 and the detents 36, and as the detents 36 are firmly held in position by the lower edge of the flange 38 the force of the spring is converted into pressure of the gasket 34 upon the end of the filler spout 12. The flange portion 20 of the cap-member 18 is provided with suitable indentations 40 which engage with the outer portion of the flange 32 of the cup-shaped member 24, when the detents 36 are removed from the flange 38 to prevent disassociation of the members 22 and 24 by the action of the spring 26 when the closure member is removed from the filler spout.

The flange 38 on the end of the filler spout is provided with a cut-away portion or slot 42 through which the detents 36 may pass when the closure member is being associated with the filler spout. Leading from the slots 42, the flange 38 is provided with cam portions 44 terminating in indentations 46 disposed between the ends of the respective cam portions 44 and the respective stop members 48.

From this description it will be observed that when the closure member is inserted in the open end of the filler spout and rotated, the cam portions 44 will force the detents 36 and the gasket 34 apart to exert pressure between the gasket and the end of the filler spout. Rotation of the cap is limited by the stop members 48 and when the detents 36 have been rotated into contact with the stop members 48, they will drop into the recesses 46 to thereby lock the closure member against accidental disassociation from the end of the filler spout.

The cap member 18 of the closure member is provided at the location of the diametrically opposed detents 36 with outwardly extended ears or finger members 50, by means of which a better grip may be obtained upon the closure member to rotate it into locked position upon the filler spout. The filler spout is provided with a pair of similarly located outwardly extending ears 52, which underlie the finger pieces 50 when the closure member is in operative association with the filler spout. These outwardly extending members 52 serve to indicate the locked position of the cap so that the cap can be readily secured in locked position upon the spout even in total darkness and incidentally serves to protect the overlying finger members 50 and may also be used for the purpose of securing additional leverage when applying the closure member to the filler spout.

The outer cup-shaped member 24 extends for an appreciable distance from the gasket 34 and is provided at its closed end with a rounded edge as indicated at 54 in order that this member may serve as a guide when the closure member is being inserted into the open end of the filler spout. The outer cup shaped member 24 has a close fit in the open end of the spout 12, thus guiding the assembly 10 so that one of the detents 36 cannot engage the cam with the cap cocked or tilted so that the other detent does not engage.

The spring 26 is provided with sufficient strength to support the member 54 against the weight of the contents of the tank to which the filler spout 12 it attached, even though the tank is inverted and subjected to the action of centrifugal force; and, by reason of the pivotal bearing of the spring seat 28 upon the hemispherical abutment 30 friction between the spring and the member 24 which might tend to wear the gasket is eliminated and the spring exerts an even pressure around the entire circumference of the gasket 34 to effectively seal the closure against leakage. Furthermore, because of the considerable distance, when the closure member is in operative association with the filler spout, between the detents 40 and the portion of the flange 32 with which the detents engage when the closure member is disassociated from the filler spout, the gasket 34 may be made thick and a large amount of wear of the gasket may take place before leakage will occur.

While there has been illustrated and described a particular mechanical embodiment of what is now considered to be the preferred form of the idea of the invention, it is to be understood that the invention is not limited to the particular construction so illustrated and described, but that such changes in the size, shape and arrangements of parts may be resorted to as come within the scope of the appended claims.

Having now described the invention so that others skilled in the art may clearly understand the same, what it is desired to secure by Letters Patent is as follows:

1. In a filler spout closure member, a pair of telescopically associated members adapted to be received in the open end of the filler spout and arranged upon relative movement in a separating direction to exert pressure upon the fluid seal between said filler spout and said closure member, a flanged cap member rigidly secured to the inner of said telescopically associated members and having edge portions engaging said filler spout to maintain said inner member in position in the end of said filler spout, a gasket carrying flange on the outer of said telescopic members arranged to resiliently urge said gasket into contact with the end of said filler spout, and a compression spring included within said telescopic members to exert a force in a direction tending to separate said members to thereby exert pressure upon said gasket.

2. In a filler spout closure member, a pair of telescopically associated cup-shaped members adapted to be inserted in the open end of the filler spout, a cap member secured to the inner of said telescopically associated members and provided with edge portions adapted to engage the end of said filler spout to firmly secure said inner telescopic member in position in said filler spout, a flange on said outer telescopic member adapted to overlie the end of said filler spout, a gasket carried by said flange to contact the end of said filler spout, a spring included within said members to exert a force in a direction tending to separate said members to apply pressure to said gasket, and a pivotal bearing between the associated end of said spring and the closed end of the outer of said telescopically associated cup-shaped members to equalize the pressure of said spring on said gasket.

3. In a filler spout closure member, a pair of telescopically associated cup-shaped members adapted to be inserted in the open end of the filler spout, a cap member secured to the inner of said telescopically associated members and provided with edge portions adapted to engage the end of said filler spout to firmly secure said inner telescopic member in position in said filler spout, a flange on said outer telescopic member adapted to overlie the end of said filler spout, a gasket carried by said flange to contact the end of said filler spout, and a spring included within said telescopically associated member to exert a force in a direction tending to separate said members and apply pressure to said gasket, the outer of said telescopically associated members being formed as a guide to assist in inserting said closure member into said filler spout.

JAMES M. SHOEMAKER.